(12) United States Patent
Downie et al.

(10) Patent No.: US 8,421,626 B2
(45) Date of Patent: Apr. 16, 2013

(54) RADIO FREQUENCY IDENTIFICATION TRANSPONDER FOR COMMUNICATING CONDITION OF A COMPONENT

(75) Inventors: John D. Downie, Painted Post, NY (US); Matthew S. Whiting, Lawrenceville, PA (US); James S. Sutherland, Corning, NY (US); Richard E. Wagner, Painted Post, NY (US); Leo Nederlof, Antwerp (BE)

(73) Assignee: Corning Cable Systems, LLC, Hickory, NC (US)

( * ) Notice: Subject to any disclaimer, the term of this patent is extended or adjusted under 35 U.S.C. 154(b) by 51 days.

(21) Appl. No.: 11/590,377

(22) Filed: Oct. 31, 2006

(65) Prior Publication Data

US 2008/0100440 A1    May 1, 2008

(51) Int. Cl.
*G08B 13/14* (2006.01)

(52) U.S. Cl.
USPC .................. 340/572.1; 340/568.1; 340/568.4; 340/686.1; 340/686.4; 340/687; 340/10.1; 340/539.1

(58) Field of Classification Search .... 340/572.1–572.9, 340/584, 687, 686.4, 870.16–870.17, 568.1–568.4, 340/505, 539.1, 539.26–539.29, 540, 601, 340/602, 635–656, 686.1, 10.1–10.6; 385/100, 385/134, 147, 88–94; 235/375–385
See application file for complete search history.

(56) References Cited

U.S. PATENT DOCUMENTS

| | | | |
|---|---|---|---|
| 4,709,339 A * | 11/1987 | Fernandes | 700/293 |
| 4,889,977 A | 12/1989 | Haydon | |
| 5,483,467 A | 1/1996 | Krupka et al. | |
| 5,528,222 A | 6/1996 | Moskowitz et al. | |
| 5,821,510 A | 10/1998 | Cohen et al. | |
| 5,910,776 A | 6/1999 | Black | 340/825.35 |
| 5,914,862 A | 6/1999 | Ferguson et al. | |
| 5,995,006 A | 11/1999 | Walsh | |
| 6,002,331 A | 12/1999 | Laor | 340/539 |

(Continued)

FOREIGN PATENT DOCUMENTS

| | | |
|---|---|---|
| DE | 19841738 | 3/2000 |
| DE | 10249414 A1 | 5/2004 |

(Continued)

OTHER PUBLICATIONS

Patent Cooperation Treaty, International Search Report for International Application No. PCT/US07/22896, May 9, 2008.

(Continued)

*Primary Examiner* — Jennifer Mehmood
*Assistant Examiner* — Ryan Sherwin
(74) *Attorney, Agent, or Firm* — Joseph M. Homa; Steven Terranova

(57) ABSTRACT

There is provided a passive RFID transponder assembly that includes a condition responsive device adapted to read a condition relating to the component that is associated with the RFID transponder assembly. The condition that is read by the condition responsive device relates to physical contact with a field technician or a mating component, relates to electrical connection between an integrated circuit chip and an antenna, relates to one or more environmental conditions, or the like. The components with which the RFID transponder assemblies are associated include components of telecommunications equipment, such as fiber optic connectors, fiber optic adapters, fiber optic patch panels, copper connectors, and copper adapters to list some non-limiting examples.

34 Claims, 10 Drawing Sheets

U.S. PATENT DOCUMENTS

| | | | |
|---|---|---|---|
| 6,025,725 A | 2/2000 | Gershenfeld et al. | |
| 6,025,783 A * | 2/2000 | Steffens, Jr. | 340/644 |
| 6,100,804 A | 8/2000 | Brady et al. | |
| 6,118,379 A | 9/2000 | Kodukula et al. | |
| 6,127,929 A | 10/2000 | Roz | |
| 6,133,835 A | 10/2000 | De Leeuw et al. | |
| 6,164,551 A | 12/2000 | Altwasser | |
| 6,232,870 B1 | 5/2001 | Garber et al. | |
| 6,424,263 B1 | 7/2002 | Lee et al. | |
| 6,424,315 B1 | 7/2002 | Glenn et al. | |
| 6,496,113 B2 | 12/2002 | Lee et al. | |
| 6,496,382 B1 | 12/2002 | Ferguson et al. | |
| 6,522,308 B1 | 2/2003 | Mathieu | |
| 6,618,022 B2 | 9/2003 | Harvey | |
| 6,693,513 B2 | 2/2004 | Tuttle | |
| 6,784,802 B1 | 8/2004 | Stanescu | 340/687 |
| 6,808,116 B1 | 10/2004 | Eslambolchi et al. | 235/492 |
| 6,829,427 B1 | 12/2004 | Becker | |
| 6,847,856 B1 | 1/2005 | Bohannon | 700/115 |
| 6,857,897 B2 | 2/2005 | Conn | |
| 6,897,374 B2 | 5/2005 | Garber et al. | |
| 6,898,368 B2 | 5/2005 | Colombo et al. | |
| 6,899,626 B1 | 5/2005 | Luciano et al. | |
| 6,915,050 B2 | 7/2005 | Koyasu et al. | |
| 6,924,997 B2 | 8/2005 | Chen et al. | |
| 6,968,994 B1 | 11/2005 | Ashwood Smith | |
| 6,971,895 B2 | 12/2005 | Sago et al. | |
| 6,973,243 B2 | 12/2005 | Koyasu et al. | |
| 6,999,028 B2 | 2/2006 | Egbert | |
| 7,014,100 B2 | 3/2006 | Zierolf | |
| 7,061,366 B2 | 6/2006 | Bell et al. | |
| 7,068,912 B1 | 6/2006 | Becker | |
| 7,069,345 B2 | 6/2006 | Shteyn | |
| 7,080,945 B2 | 7/2006 | Colombo et al. | |
| 7,081,808 B2 | 7/2006 | Colombo et al. | |
| 7,102,520 B2 | 9/2006 | Liu et al. | |
| 7,151,455 B2 | 12/2006 | Lindsay et al. | 340/572.3 |
| 7,158,031 B2 | 1/2007 | Tuttle | |
| 7,158,033 B2 | 1/2007 | Forster | |
| 7,165,728 B2 | 1/2007 | Durrant et al. | 235/492 |
| 7,170,393 B2 | 1/2007 | Martin | |
| 7,194,180 B2 | 3/2007 | Becker | |
| 7,205,898 B2 | 4/2007 | Dixon et al. | |
| 7,209,042 B2 * | 4/2007 | Martin et al. | 340/572.8 |
| 7,210,858 B2 | 5/2007 | Sago et al. | |
| 7,221,277 B2 | 5/2007 | Caron et al. | |
| 7,224,278 B2 | 5/2007 | Phaneuf et al. | |
| 7,224,280 B2 | 5/2007 | Ferguson et al. | |
| 7,226,217 B1 | 6/2007 | Benton et al. | |
| 7,233,250 B2 | 6/2007 | Forster | |
| 7,243,837 B2 | 7/2007 | Durrant et al. | |
| 7,249,705 B2 | 7/2007 | Dudley | |
| 7,253,735 B2 | 8/2007 | Gengel et al. | |
| 7,265,674 B2 | 9/2007 | Tuttle | |
| 7,275,970 B2 | 10/2007 | Hoshina | |
| 7,296,938 B1 * | 11/2007 | Shapson et al. | 385/92 |
| 7,297,028 B2 | 11/2007 | Daikuhara et al. | |
| 7,298,266 B2 | 11/2007 | Forster | |
| 7,298,330 B2 | 11/2007 | Forster | |
| 7,306,489 B2 | 12/2007 | Werthman et al. | 439/620.01 |
| 7,336,883 B2 | 2/2008 | Scholtz | |
| 7,348,884 B2 | 3/2008 | Higham | |
| 7,349,605 B2 | 3/2008 | Noonan et al. | |
| 7,352,285 B2 | 4/2008 | Sakama et al. | |
| 7,352,289 B1 | 4/2008 | Harris | |
| 7,356,208 B2 | 4/2008 | Becker | |
| 7,374,101 B2 | 5/2008 | Kaneko | |
| 7,468,669 B1 * | 12/2008 | Beck et al. | 340/572.1 |
| 7,554,448 B2 * | 6/2009 | Tomioka | 340/572.1 |
| 7,636,050 B2 * | 12/2009 | Nordin et al. | 340/635 |
| 8,172,468 B2 | 5/2012 | Jones et al. | |
| 2002/0092347 A1 | 7/2002 | Niekerk et al. | 73/146.2 |
| 2003/0021580 A1 | 1/2003 | Matthews | |
| 2003/0061393 A1 | 3/2003 | Steegmans et al. | |
| 2003/0179073 A1 | 9/2003 | Ghazarian | |
| 2004/0041714 A1 | 3/2004 | Forster | 340/870.17 |
| 2004/0114879 A1 | 6/2004 | Hiereth et al. | |
| 2004/0117515 A1 | 6/2004 | Sago et al. | |
| 2004/0149736 A1 | 8/2004 | Clothier | 219/627 |
| 2004/0253874 A1 | 12/2004 | Plishner | |
| 2005/0052287 A1 | 3/2005 | Whitesmith et al. | 340/825.72 |
| 2005/0068179 A1 | 3/2005 | Roesner | 340/572.1 |
| 2005/0076982 A1 | 4/2005 | Metcalf et al. | 152/152.1 |
| 2005/0093677 A1 | 5/2005 | Forster et al. | |
| 2005/0150962 A1 | 7/2005 | Colombo et al. | |
| 2005/0215119 A1 | 9/2005 | Kaneko | |
| 2005/0224585 A1 | 10/2005 | Durrant et al. | |
| 2005/0232636 A1 | 10/2005 | Durrant et al. | |
| 2005/0242950 A1 | 11/2005 | Lindsay et al. | |
| 2005/0259930 A1 | 11/2005 | Elkins, II et al. | 385/100 |
| 2005/0285718 A1 | 12/2005 | Enguent | 340/10.1 |
| 2006/0006999 A1 * | 1/2006 | Walczyk et al. | 340/539.27 |
| 2006/0015233 A1 | 1/2006 | Olsen, III et al. | |
| 2006/0019540 A1 | 1/2006 | Werthman et al. | |
| 2006/0044148 A1 | 3/2006 | Daniels et al. | |
| 2006/0139149 A1 | 6/2006 | Faro et al. | |
| 2006/0145863 A1 * | 7/2006 | Martin et al. | 340/572.8 |
| 2006/0148279 A1 | 7/2006 | German et al. | |
| 2006/0166546 A1 | 7/2006 | Ashizawa et al. | |
| 2006/0232419 A1 | 10/2006 | Tomioka et al. | |
| 2006/0233506 A1 | 10/2006 | Noonan et al. | 385/134 |
| 2006/0267737 A1 | 11/2006 | Colby | |
| 2006/0267778 A1 | 11/2006 | Gengel et al. | |
| 2007/0018787 A1 | 1/2007 | Martinez de Velasco Cortina et al. | |
| 2007/0023525 A1 | 2/2007 | Son et al. | |
| 2007/0053644 A1 | 3/2007 | Scholtz | |
| 2007/0057771 A1 * | 3/2007 | Tomioka | 340/10.1 |
| 2007/0096891 A1 * | 5/2007 | Sheriff et al. | 340/457.1 |
| 2007/0120684 A1 | 5/2007 | Utaka et al. | |
| 2007/0152828 A1 | 7/2007 | Mohalik | |
| 2007/0205897 A1 | 9/2007 | Forster | |
| 2007/0205902 A1 | 9/2007 | Cote et al. | |
| 2007/0216534 A1 | 9/2007 | Ferguson et al. | |
| 2007/0236355 A1 | 10/2007 | Flaster et al. | |
| 2007/0247284 A1 | 10/2007 | Martin et al. | |
| 2007/0273507 A1 | 11/2007 | Burchell et al. | |
| 2008/0030353 A1 * | 2/2008 | O'Toole et al. | 340/584 |
| 2008/0048826 A1 | 2/2008 | Agrawal et al. | |
| 2008/0100456 A1 | 5/2008 | Downie et al. | |
| 2008/0159738 A1 | 7/2008 | Lavranchuk | |
| 2008/0240724 A1 | 10/2008 | Aguren | |
| 2011/0274437 A1 | 11/2011 | Jones et al. | |

FOREIGN PATENT DOCUMENTS

| | | |
|---|---|---|
| EP | 1455550 A2 | 3/2004 |
| GB | 2371211 A | 7/2002 |
| JP | 03-242795 | 10/1991 |
| JP | 2002-264617 | 9/2002 |
| JP | 2003-148653 | 5/2003 |
| JP | 2003-172827 | 6/2003 |
| JP | 2003-229215 | 8/2003 |
| JP | 2004-039389 | 2/2004 |
| JP | 2004-142500 | 5/2004 |
| JP | 2004-152543 | 5/2004 |
| JP | 2004-245963 | 9/2004 |
| JP | 2004-247090 | 9/2004 |
| JP | 2004-264901 | 9/2004 |
| JP | 2004-265624 | 9/2004 |
| JP | 2004-317737 | 11/2004 |
| JP | 2004-349184 | 12/2004 |
| JP | 2005-018175 | 1/2005 |
| JP | 2005-033857 | 2/2005 |
| JP | 2005-050581 | 2/2005 |
| JP | 2005-084162 | 3/2005 |
| JP | 2005-086901 | 3/2005 |
| JP | 2005-087135 | 4/2005 |
| JP | 2005-092107 | 4/2005 |
| JP | 2005-134125 | 5/2005 |
| JP | 2005-216698 | 8/2005 |
| JP | 2005-302403 | 10/2005 |
| JP | 2005-315980 | 11/2005 |
| JP | 2005-339983 | 12/2005 |
| JP | 2006-054118 | 2/2006 |
| JP | 2006-245983 | 9/2006 |
| JP | 2006-279650 | 10/2006 |
| JP | 2007-087849 | 4/2007 |

| | | | |
|---|---|---|---|
| JP | 2007-088957 | 4/2007 | |
| JP | 2007-158993 | 6/2007 | |
| JP | 2007-189774 | 7/2007 | |
| JP | 2007-221400 | 8/2007 | |
| WO | 03/098175 | A1 | 11/2003 |
| WO | 2004/030154 | A2 | 4/2004 |
| WO | 2005/069203 | A2 | 7/2005 |
| WO | 2005/069203 | A3 | 7/2005 |
| WO | 2006058119 | A1 | 6/2006 |
| WO | WO2008000656 | A1 | 1/2008 |
| WO | 2009091888 | A1 | 7/2009 |

OTHER PUBLICATIONS

Non-final Office Action for U.S. Appl. No. 13/418,752 mailed Jul. 2, 2012, 8 pages.

International Search Report for PCT/US2010/057605 mailed Feb. 17, 2011, 2 pages.

Written Open of the International Searching Authority for European Patent application 10788172.4-2210 mailed Jul. 6, 2012, 14 pages.

* cited by examiner

RADIO FREQUENCY IDENTIFICATION TRANSPONDER FOR COMMUNICATING CONDITION OF A COMPONENT

FIELD OF THE INVENTION

The present invention relates generally to use of Radio Frequency Identification (RFID) devices with respect to changes of condition. More particularly, the present invention concerns providing RFID functionality to associated components, such as telecommunications equipment, whereby the RFID devices can provide a signal indicating the condition relating to the associated component when interrogated.

BACKGROUND OF THE INVENTION

Fiber optic cables are well known for connecting optical devices and systems. Some cables carry multiple fibers and have one or more plugs, such as connectors. "Pre-connectorized" cables have their connectors attached during manufacture, while others are terminated and have connectors attached upon installation. Cables known as patch cables, jumper cables, and break out cables are often relatively short and have one or more connectors at each end. In use, each connector will be placed within an adapter located in a piece of equipment, patch panel, another connector, etc.

As fiber optic equipment and networks become more common and more complex, the identification of proper plugs and sockets (into which the plugs are mated) for setting up and maintaining the systems accordingly becomes more complex. Therefore, indicia such as labels, hang tags, marking, coloration, and striping have been used to help identify specific fibers, cables, plugs, and/or sockets. While such indicia have been helpful in providing information to the technician setting up or servicing a system, further improvement could be achieved.

RFID systems have therefore been applied to fiber optic systems to provide information regarding fibers, plugs, and sockets. For example, RFID transponders (comprising an antenna and an RFID integrated circuit chip) have been attached to plugs and sockets for use in identification. The RFID integrated circuit chip stores information for RF communication. Typically, these RFID transponders have been passive, rather than active, so they communicate (by transmitting, reflecting, modifying, or otherwise sending RF signals) the stored information responsive to interrogation by an RF signal received by the RFID transponder antenna. An RFID reader comprising a transceiver that sends an RF signal to the RFID transponders and reads the responsive RF signals communicated by the RFID transponders could then interrogate the RFID transponders to determine stored information about the cable, plug, and/or socket. In some fiber optic connector systems, an RFID transceiver antenna is located near the socket for detecting an RFID transponder attached to the inserted plug, and the transceiver antenna further is connected to the remainder of the transceiver via wiring.

The various systems above generally rely upon a certain degree of proximity for operation. That is, the reader in the system would identify nearby RFID transponders, or would identify pairs of transponders close together (for example, on a plug and on a socket holding the plug), all within the read range of the reader. The read range could be designed to be small, for example for rows of readers mounted on adjacent sockets for reading only an inserted plug's RFID signal. Alternatively, the read range could be much larger, for example for handheld or room-size readers for reading multiple signals from one or more pieces of equipment.

However, such RFID systems have certain drawbacks. For example, the operation of such systems is dependent upon the relative proximity to a targeted item, which can lead to either difficult or inaccurate results, as signals may be received and/or communicated by unintended RFID transponders on items near the targeted item. Accordingly, the read range of a given RFID reader, whether incorporated into the socket housing or remote, can be a limiting factor. Further, if a plug were only partially inserted into a socket so as not to make a functional connection with the optical fiber(s), the RFID antennas in the plug and/or socket might inaccurately indicate the connection were made due to the proximity between the plug and the socket.

Moreover, when dealing with an entire panel of connectorized cables and sockets, it may not be practical or even possible to rely upon proximity, either plug-to-socket or reader-to-transponder, as a method of querying a targeted RFID transponder. In fact, the RFID transponders across the entire panel could respond to an RFID reader in certain situations, thereby providing no useful information as to identification of individual plugs and/or sockets of interest.

In such situations, a technician desiring to identify a particular connection of a plug to a socket may need to separate one or more plugs from their respective sockets in order to move the plug and/or socket out of the read range of the RFID reader in order for the RFID reader to detect a change so that the technician can identify one or more connections based upon the change in readings. Such disconnections and reconnections add steps to the process of identification in terms of unplugging or at least re-orienting objects in a certain way to avoid "false" readings from the panel due to proximity issues. As it may be necessary to remove multiple plugs from sockets, such serial disconnection can be even more undesirable when equipment is operating and disconnections cause problems for the users of the systems. In such cases, the whole system may have to be shut down just to allow for the identification of a single component and/or connection, even if sophisticated RFID equipment is in place. The process becomes more complex when extended to entire networks including multiple equipment housings, cables, etc., perhaps spread throughout a building.

It can also be difficult for the technician in the field to determine how or why a plug, cable, socket, or the like has failed or otherwise needs replacing. Again, identification of a single item within a group can be difficult, as well as identifying conditions leading to a particular issue. Conditions causing the problem could be transitory and no longer apparent or in effect when the technician arrives for service. Accordingly, providing more information to the technician for purposes of identification, troubleshooting, service, warranty, etc. would also be useful.

Therefore, a need exists for RFID technology that provides simple, reliable, and/or unobtrusive identification of one or more components and mapping of networks of components, including identification of location and past and/or present condition.

SUMMARY OF THE INVENTION

According to certain embodiments of the present invention, a passive RFID transponder assembly is provided for selective communication with an RFID reader to communicate a condition relating to a component with which the RFID transponder assembly is associated. The RFID transponder assembly includes an integrated circuit chip, an antenna adapted for electrical connection with the integrated circuit chip, and at least one condition responsive device electrically connected to the integrated circuit chip. The condition responsive device of some embodiments of the present invention detects conditions relating to selective physical contact of the component by a technician or a mating component, relating to electrical connection of the antenna and the integrated circuit chip, or relating to environmental conditions such as temperature, pressure, humidity, or light exposure. The condition responsive device of some embodiments of the present invention is physically included within the integrated circuit chip. Still further embodiments of the present invention provide an external power source to power the integrated circuit chip and/or provide a transponder assembly configured to communicate identification information along with the condition relating to the component.

The RFID transponder assemblies of various embodiments of the present invention are associated with components of telecommunications equipment, such as fiber optic and/or copper connectors and/or adapters, including some embodiments of the present invention in which the antenna of the RFID transponder assembly is associated with a mating component of telecommunications equipment such that electrical connection between the integrated circuit chip associated with the component of telecommunications equipment and the antenna associated with the mating component of telecommunications equipment is the condition detected by the condition responsive device.

It is to be understood that both the foregoing general description and the following detailed description present embodiments of the invention, and are intended to provide an overview or framework for understanding the nature and character of the invention as it is claimed. The accompanying drawings are included to provide a further understanding of the invention, and are incorporated into and constitute a part of this specification. The drawings illustrate the various exemplary embodiments of the invention, and together with the description serve to explain the principals and operations of the invention.

DETAILED DESCRIPTION OF THE INVENTION

Figure 1:
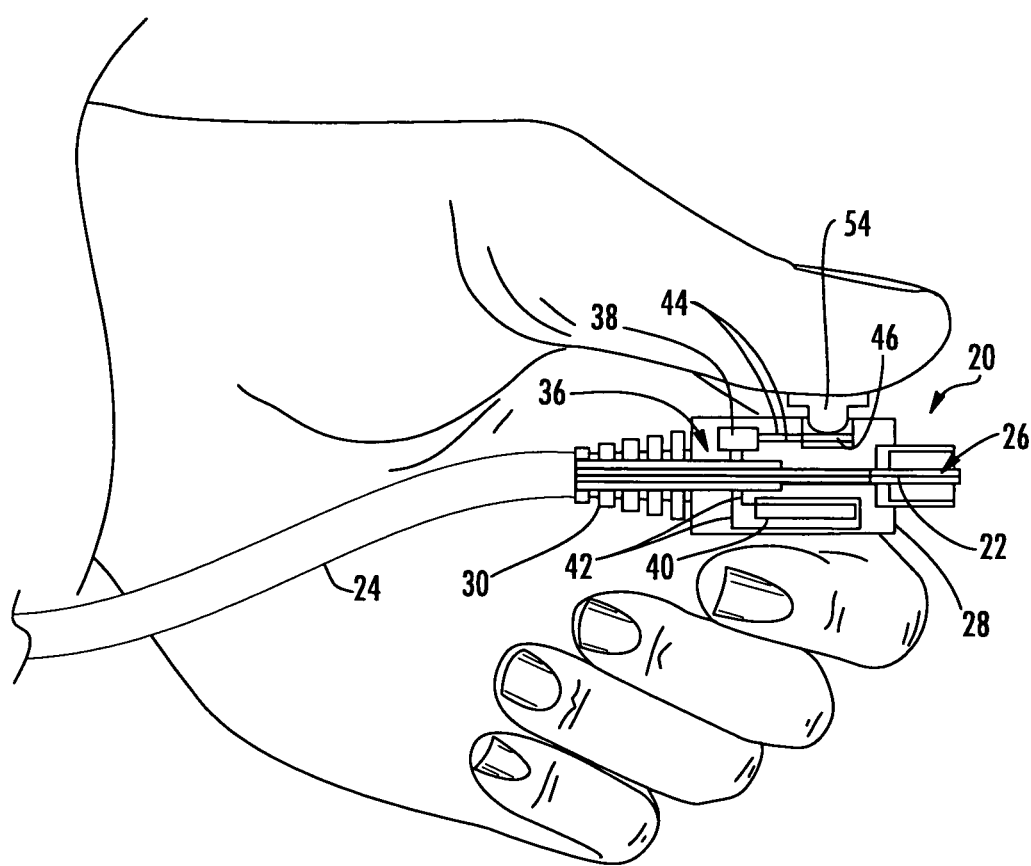
FIG. 1 is a representative schematic view of a plug according to certain embodiments of the invention including a condition responsive device operable via a push button.

Reference will now be made in detail to the present preferred embodiments of the invention, examples of which are illustrated in the accompanying drawings. Whenever possible, like or similar reference numerals will be used throughout the drawings to refer to like or similar parts. The exemplary embodiments of the invention employ RFID technology to allow for simple, reliable, and/or unobtrusive identification of one or more components, including identification of location and past and/or present condition. It should be understood that the embodiments disclosed herein are merely examples, each incorporating certain benefits of the present invention. Various modifications and alterations may be made to the following examples within the scope of the present invention, and aspects of the different examples may be mixed in different ways to achieve yet further examples. Accordingly, the true scope of the invention is to be understood from the entirety of the present disclosure, in view of but not limited to the embodiments described herein.

As broadly embodied in FIGS. 1-15 examples of connectors, connector assemblies, cables, and mapping systems are disclosed, in which RFID technologies are employed, along with one or more condition responsive devices in certain embodiments of the present invention. As discussed more fully below, the RFID technologies can be configured in different ways, resulting in different functionalities according to the invention. In addition, complete RFID transponders and/or portions of RFID transponders may be located on a plug (such as a connector), a socket (such as an adapter), a housing, a separate object, or other components (or portions thereof). The condition responsive devices are responsive to one or more conditions and/or change in condition such as a state of contact, electrical contact closure, temperature, pressure, humidity, light, or capacitance (and/or impedance). The condition responsive device may be user-operated, for example by pressing a push button or connecting or disconnecting a plug from a socket, or the condition responsive device may be a passively operated sensor, or both could be employed together. Further, the condition and/or change in condition indicated by the condition responsive device may permit or preclude operation of a given RFID transponder. Alternatively, such condition and/or change in condition may simply be registered and/or reported by the RFID transponder without altering the operational status of the RFID transponder. It should also be understood that elements of the embodiments below may be mixed in different ways to achieve still further embodiments and functionality within the scope of the invention. Although the illustrated embodiments of the present invention are directed to passive RFID transponders, further embodiments include one or more active RFID transponders depending upon the particular functionality of the RFID transponder system desired.

Although the embodiments of the present invention described herein are directed to RFID systems used with components of telecommunications equipment, such as fiber optic connectors and adapters or copper connector and adapters and other fiber optic and/or copper components, further embodiments of the present invention are used with non-telecommunications equipment, particularly regarding components that interconnect and/or are exposed to various conditions for which it is desirable to know the location, connectivity, and/or conditions of the components. The terms plug and socket are generally used herein to define portions of components that are adapted for connecting to one another, such as a connector that is received by an adapter, and are not necessarily limited to standard plugs and sockets.

Figure 2:
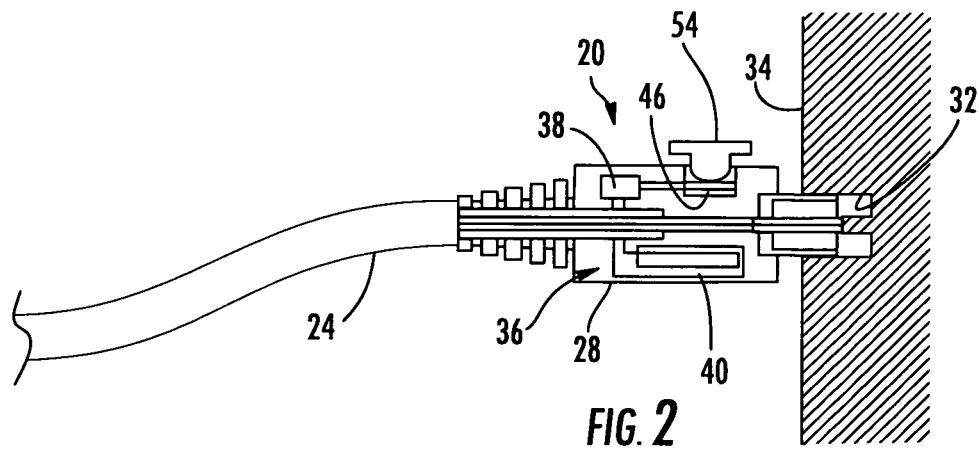
FIG. 2 is a schematic view of the plug of FIG. 1 as inserted in a socket.
Figure 3:
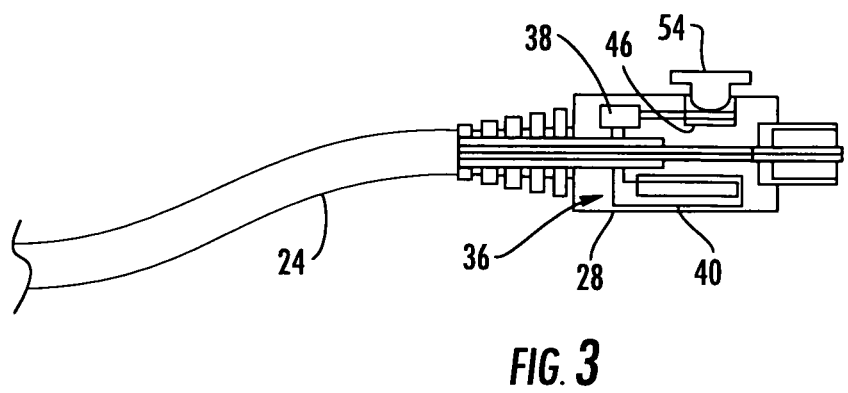
FIG. 3 is a schematic view of a plug as in FIG. 1, wherein the plug defines an fiber optic connector.

FIGS. 1-3 show one example of a plug, such as connector 20, for terminating an optical fiber 22. The plugs of further embodiments of the present invention include alternative types of connectors such as MT, MJ, RJ, SC, LC, etc., as well as connector fanout assemblies, housings for protectively sealing the connector-adapter interface, and the like. As shown in FIGS. 1-3, fiber 22 is located within an end of cable 24. Fiber 22 is terminated at ferrule 26 located within body 28 of connector 20. Strain relief 30 is provided at one end of body 28 to protect fiber 22. Cable 24 may or may not be pre-connectorized. Connector 20 may be inserted into a socket, such as adapter 32, within a housing 34. Again, adapter 32 and housing 34 are illustrative only, and any type of socket disposed in a component can be employed according to the present invention.

As shown, an RFID transponder 36 is attached to body 28. Therefore, the RFID transponder is associated with the plug. The RFID transponder is associated with a plug, socket, component, or the like of the present invention when the RIFD transponder or a portion thereof, is position on or adjacent to the respective plug, socket, component, or the like such that the RFID transponder, when activated, is capable of communicating the identity and/or general location of the associated plug, socket, component, or the like such that an RFID reader is able to ascertain the identity and/or general location of the associated plug, socket, component, or the like. The RFID transponder 36 illustrated in FIGS. 1-3 includes an RFID integrated circuit chip 38 and an RFID antenna 40 electrically connected by wiring 42. RFID transponder 36 may be in the form of an RFID tag. If desired, RFID transponder 36 may be embedded within body 28, or it may be attached to the inside or outside of the body, such that the RFID transponder is associated with the connector 20.

Additional wiring 44 electrically connects RFID integrated circuit chip 38 to a condition responsive device 46 mounted on or within (as shown) body 28 of connector 20. Condition responsive device 46 is capable of detecting at least one condition and/or change of condition and providing a signal to RFID transponder 36 responsive to the detected condition. In some embodiments of the present invention, RFID transponder 36 and/or condition responsive device 46 are selectively activateable and, when activateable, may be activated when interrogated by an RFID reader to communicate a signal representative of the detected condition. Further embodiments of the present invention comprise RFID transponders and/or condition responsive devices that are activateable when the associated component is in physical contact with a technician and/or mating component; while still further embodiments comprise RFID transponders and/or condition responsive devices that are continuously activateable.

Activation may be accomplished via an RFID reader (not shown), having its own RFID circuitry and RFID antenna, which may or may not also be located on an integrated circuit chip as in RFID transponder 36 of some embodiments of the present invention. The RFID reader along with an associated database and processing element, in accordance with some embodiments of the invention, comprise portions of an RFID system for identifying a plurality of components, as described more fully below. The RFID reader and/or its associated elements may be a separate device from the component that includes adapter 32, such as a handheld RFID reader or an RFID reader disposed somewhere on the premises within the RFID read range of the components being monitored, depending on the desired application and functionality. Alternatively, an RFID reader may be located on a housing of a component, such as the type in FIG. 2 that holds adapter 32, and may be either associated with or spaced apart from adapter 32. One RFID reader, whether in a remote housing or associated with the component comprising the adapter, may be used to interact with multiple RFID transponders. It should be understood that certain aspects of the invention are directed to connector and RFID transponder designs alone, for use with one or more RFID readers, while in other aspects, the invention is directed to the combination of the RFID transponder(s), RFID reader(s), and/or components associated with the RFID transponder(s).

RFID integrated circuit chip 38 may include stored information such as serial number, type of connector, cable type, manufacturer, manufacturing date, installation date, location, lot number, performance parameters (such as attenuation measured during installation), identification of what is at other end of the cable, etc. Such information could be pre-loaded on RFID integrated circuit chip 38 at manufacture or upon installation via an RFID reader. Furthermore, the RFID reader, and any associated database and/or processing element, of certain embodiments of the present invention includes stored information relating to one or more RFID transponder and/or components in order to facilitate identification, mapping, or other processing of the information received from one or more RFID transponders. More specifically, the RFID reader includes information that correlates a unique identification number of an RFID transponder to a particular plug and/or socket, to a particular component (such as a fiber optic cable assembly with one or more connectors), to other portions of the component (such as correlating a first connector of a fiber optic cable to a second connector, or grouping multiple adapters of a patch panel, etc.), to past and/or current mating components, and any other parameter, connection, association, or other information that a technician may want know or record when working with and/or monitoring the one or more components.

Some embodiments of the present invention comprise a condition responsive device for detecting a condition relating to the component with which the condition responsive device is associated. Condition responsive device 46 of FIGS. 1-3 comprises a mechanical switch, or more specifically a push button switch, with two electrical contacts. This exemplary embodiment and other similar embodiments of the present invention enable the condition responsive device to detect selective physical contact of the component, or more specifically the plug and/or condition responsive device, by a technician and/or a mating component, such as a socket. Alternatively, the condition responsive device 46 could be a capacitance or impedance sensor, or other mechanical, electrical, or electromechanical sensors. As illustrated, condition responsive device 46 is actuated by a hand-operated push button 54, which may be spring loaded, but other activation structures such as slides, contact sensors, and the like are also provided in further embodiments of the present invention. In alternative embodiments of the present invention, push button 54 can be activated by contact with housing 34 upon insertion of connector 20 into adapter 32. Wiring 44 connects condition responsive device 46 to RFID integrated circuit chip 38 to provide information regarding the condition (such as physical contact by the technician, receipt of the plug into the socket, or the like) detected by the condition responsive device. For example, certain two-position switches define a condition responsive device that detects and provides information regarding the position of the switch. Thus, when activated, RFID transponder 36 would provide information regarding the condition detected by the at least one condition responsive device 46 and may also provide other information, such as identification information relating to the RFID transponder and/or other RFID transponders. A technician could identify a given cable/connector by having an RFID reader (not shown) interrogate a panel full of plug RFID transponders associated with the connectors and then pressing the button on the given cable/connector, and monitoring the output from the RFID reader to look for which cable/connector indicates a certain condition and/or change in condition. Importantly, this could be accomplished if desired without otherwise manipulating, plugging, or unplugging the cable/connector, thus preventing undesirable disconnection of services (albeit temporary) to one or more customers. The RFID transponder 36 of FIGS. 1-3 is configured and wired to always return a signal to RFID reader, regardless of the condition detected by the condition responsive device, although alternative RFID transponders could be altered to turn on and off depending on the condition, as discussed below.

In addition, RFID transponder 36 is adapted to communicate with a similar separate or interrelated RFID transponder or RFID reader (not shown) on housing 34 and/or associated with a respective adapter 32, if desired. The ability of the RFID transponders to communicate with one another, to store information of two or more RFID transponders, and/or communicate with the RFID reader information of two or more RFID transponders is discussed more fully below. Furthermore, the RFID transponders of alternative embodiments selectively assist a technician working with the components associated with the RFID transponders. For example, it would be possible to indicate to the technician which adapter a connector should be received upon the pushing of a button on the connector. RFID transmission from the RFID transponder (s) or the RFID reader could trigger such indication in various ways.

Figure 4:
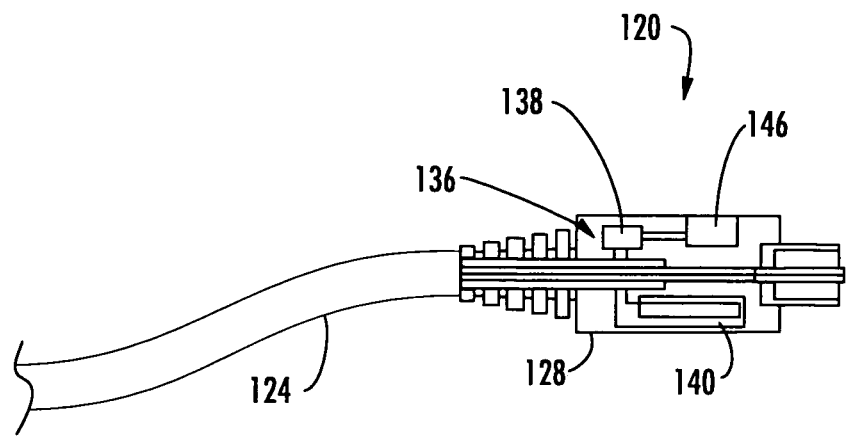
FIG. 4 is a schematic view of an alternate embodiment of a plug including an condition responsive device.

FIG. 4 shows a modified connector 120 in which condition responsive device 146 is activated without a mechanical component such as button 54 of FIGS. 1-3. Condition responsive device 146 could thus comprise an integrated sensor to sense at least one of contact, electrical contact closure, temperature, pressure, humidity, light exposure, capacitance (and/or impedance), or other environmental condition or parameter. It may be more economical to manufacture such a connector 120, wherein the moving parts of a push button are not needed.

The condition responsive device 146 could be configured to detect contact or other input from a technician, by detecting a temperature or lighting change due to gripping or covering the sensor, shining a light or laser on it, etc. In such case, condition responsive device 146 could function as above to indicate two alternative conditions. Further embodiments of the present invention include a condition responsive device 146 that functions to indicate a range of conditions corresponding for example to a present condition, past condition, past high or low conditions, etc. with reference to temperature, humidity, pressure, etc. Such information could be important for detecting and diagnosing problems, and for repair and warranty considerations. Also, such information could be used to communicate via RFID transponder 136 that certain equipment should be shut down (for example in case of contact with liquid or overheating is indicated). For certain of such functions, it may be necessary that condition responsive device 146 include a power source, either within the device itself or externally provided. Also, it may be necessary to include additional features on RFID transponder 136 or in RFID integrated circuit chip 138 to allow multiple functionalities, such as adding multiple bit capability, analog-digital converters, additional wiring connectors, etc.

Figure 5:
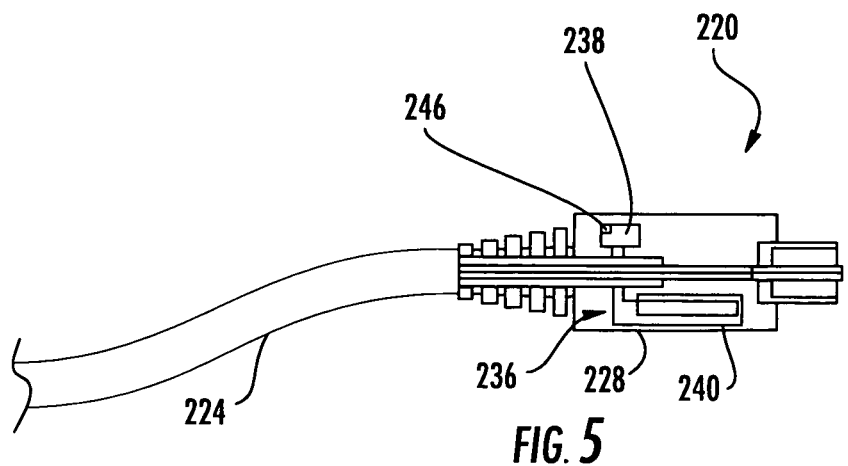
FIG. 5 is a schematic view of another alternate embodiment of a plug including a condition responsive device, wherein the condition responsive device is physically included within the integrated circuit chip of the RFID transponder.

FIG. 5 shows a connector 220 of a further embodiment of the present invention in which a condition responsive device 246 is part of RFID integrated circuit chip 238, again activated without a mechanical component such as button 54 of FIGS. 1-3. By physically including the condition responsive device 246 within the RFID integrated circuit chip 238, the remaining structure is simpler than the structure of FIG. 4, which could provide advantages in manufacturing or use.

Figure 6:
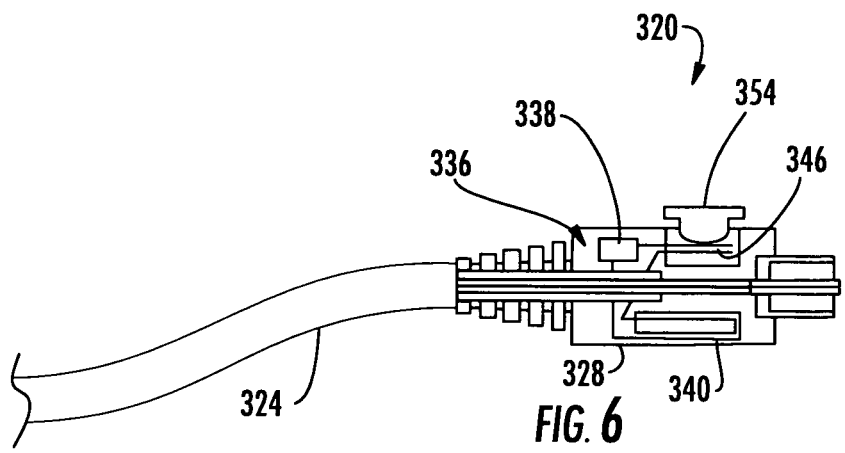
FIG. 6 is a schematic view of another embodiment of a connector including a condition responsive device comprising a push button switch, wherein pushing the button electrically connects and enables the RFID antenna.
Figure 7:
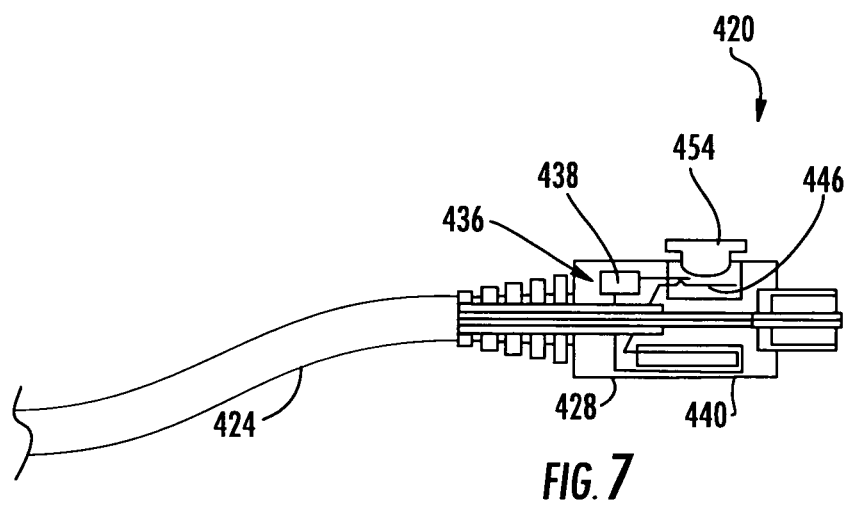
FIG. 7 is a schematic view of yet another embodiment of a connector including a condition responsive device comprising a push button switch, wherein pushing the button electrically disconnects and disables the RFID antenna.

FIG. 6 shows a connector 320 with a condition responsive device 346 that functions to complete an electrical circuit allowing RFID transponder 336 to turn on. That is, unless condition responsive device 346 detects a certain condition, RFID transponder 336 does not operate. As illustrated, push button 354 is provided for activating condition responsive device 346. Therefore, connector 320 could function somewhat like connector 20, whereby when button 354 is pressed a condition change occurs. However, the condition change occurrence is from off to on in FIG. 6, as pressing the push button 354 selectively electrically connects the condition responsive device 346 to the RFID integrated circuit chip 338. FIG. 7 shows another connector 420 with similar but opposite functionality. In connector 420, RFID transponder 436 is on unless it is turned off by the condition responsive device 446, for example by pressing button 454, which selectively electrically disconnects the condition responsive device 446 from the RFID integrated circuit chip 438. Again, the push buttons of FIGS. 1-3, 6, and 7 may be hand operated by a technician or actuated upon insertion of the plugs into the sockets or the like.

It should be understood that use of mechanical condition responsive devices and push buttons with the embodiments of FIGS. 6 and 7 are optional. Thus, the more passive condition responsive devices of FIGS. 4 and 5 in further embodiments of the present invention may also be utilized with the connectors of FIGS. 6 and 7, wherein the RFID transponders are turned on or off by signals resulting from the condition responsive devices. Also, multiple condition responsive devices, both passive and active could be employed. For example, pressing a button could actuate one condition responsive device to activate an RFID transponder, while a past or present temperature condition signal could be obtained from another condition responsive device. Still further embodiments of the present invention include condition responsive devices that detect a condition generated by a condition generating device, as described more fully below.

Figure 8:
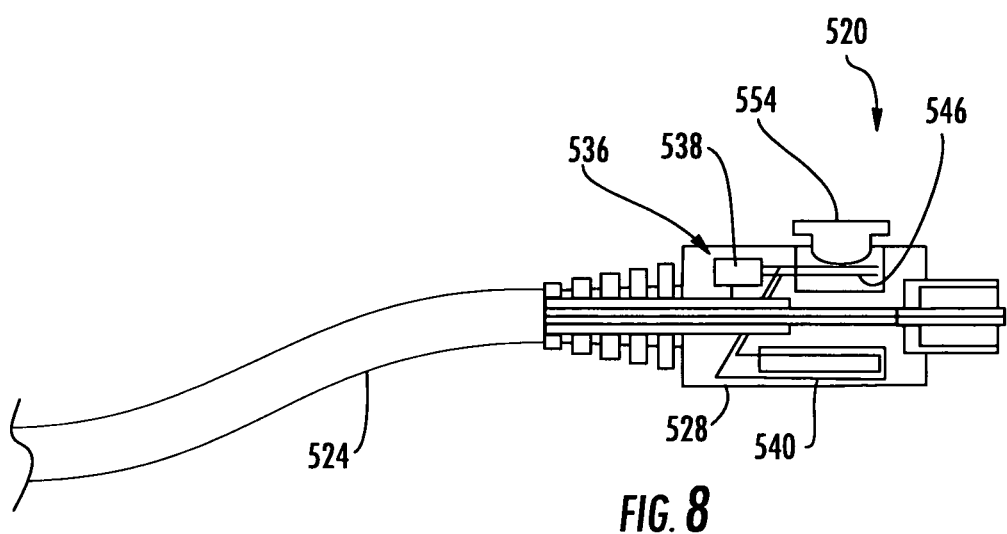
FIG. 8 is a schematic view of still another embodiment of a connector including a condition responsive device, wherein the condition responsive device comprises a variable impedance element.

FIG. 8 shows another alternate connector 520 wherein input from a shunted condition responsive device 546 is provided to RFID integrated circuit chip 538. Condition responsive device 536 could be, for example, a variable impedance element, wherein the condition responsive device varies the impedance by changing the resistance or capacitance (and/or inductance) of the condition responsive device. The variable impedance element may be placed in parallel with or in series with the leads of the RFID antenna 540. Other shunted devices and configurations could be employed for condition responsive devices of further embodiments of the present invention.

FIGS. 9-14 show various embodiments in which RFID functionality is achieved or altered when a connector is inserted into an adapter. In such fashion, the electrical connections and configurations also function as a condition responsive device, akin to those discussed above, in which the insertion of a plug into a socket makes the electrical connection that effects RFID functionality. Further, the plug-in embodiments of FIGS. 9-14 may also be used in conjunction with the concepts and structures discussed above.

Figure 9:
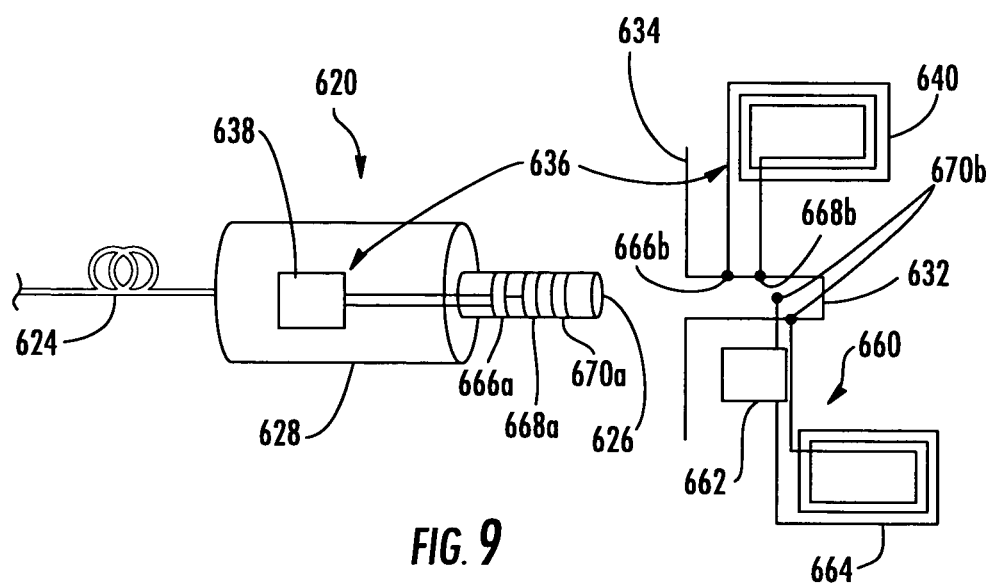
FIG. 9 is a schematic view of an embodiment of a plug having an associated plug RFID transponder and a socket having an associated socket RFID transponder, wherein functionality of the plug RFID transponder and/or the socket RFID transponder is effected by insertion of the plug into the socket.

FIG. 9 shows a connector 620 and adapter 632 whereby each includes an RFID transponder 636 and 660. RFID transponder 636 includes an RFID integrated circuit chip 638 on connector body 628 and an RFID antenna 640 on housing 634. RFID transponder 660 includes an RFID integrated circuit chip 662 and an RFID antenna 664 on housing 634. Pairs of contact points, such as electrical connections 666a, 668a and 670a on connector 620 mate with connections 666b, 668b, and 670b on housing 634. The connections 666-670 are located proximate the ferrule 626 and adapter 632, although such connections could be located on other places on body 628 and housing 634. Also, to prevent the RFID antennas from operating as a monopole when a single contact is made, four sets of connections may be used in some embodiments of the present invention to isolate the antennas.

When connector 620 is received by the adapter 632, electrical contact is made between connections 666a and 666b, 668a and 668b, and 670a and 670b. Thus, the embodiment of the present invention shown in FIG. 9 effectively operates similar to the embodiment of FIG. 7, wherein the RFID transponders 636 and 660 are not functional, unless activated by the receipt of the connector 620 into the adapter 632. Functionally, interrogation will show additional RFID transponders when such connection is made. Also, such structure provides a double check function to ensure that an inserted connector is properly received by the adapter. The structure also beneficially does not rely for such function on the relative location of the connector and housing or adapter, which as mentioned above, can lead to inaccurate results at times in various scenarios.

By placing part of RFID transponder 636 for connector 620 on housing 634, space is saved on the connector, which can be useful in some situations so as to allow for RFID functionality on a relatively smaller connector. Also, such arrangement leaves more room for other structures or condition responsive devices on the connector. If desired, the electrical contacts 670a and 670b could be omitted, allowing the RFID transponder 660 to be functional at all times. Also, RFID transponder 660 could be replaced by a transceiver to provide alternative functionality.

Figure 10:
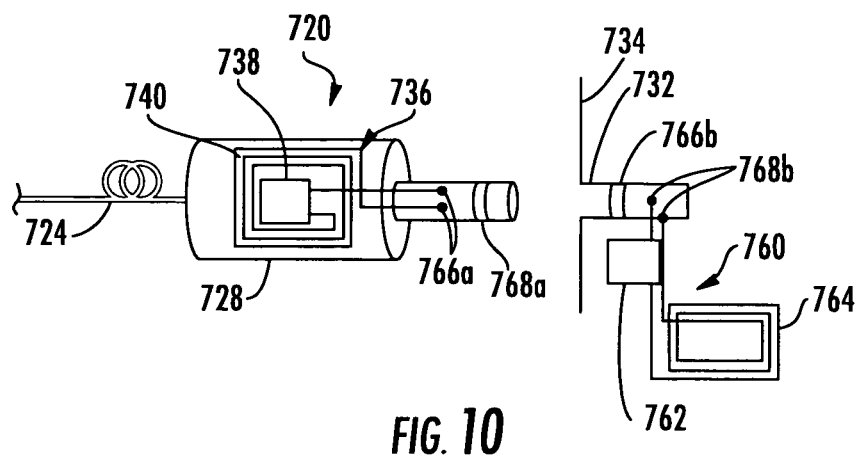
FIG. 10 is a schematic view of another embodiment of a plug having an associated plug RFID transponder and a socket having an associated socket RFID transponder, wherein functionality of the plug RFID transponder and/or the socket RFID transponder is effected by insertion of the plug into the socket.

FIG. 10 shows a modified version of that shown in FIG. 9, wherein connector RFID integrated circuit chip 738 and connector RFID antenna 740 comprise connector RFID transponder 736 that is associated with the connector 720. The adapter RFID integrated circuit chip 762 and RFID antenna 764 comprise adapter RFID transponder 760 associated with the adapter 732 of housing 734. Connections 766a and 766b, and 768a and 768b, respectively, are provided to electronically connect parts of the two RFID transponders 736 and 760 so as to render them activateable. Otherwise, connector 720 and adapter 732 are similar to that shown in FIG. 9.

Figure 11:
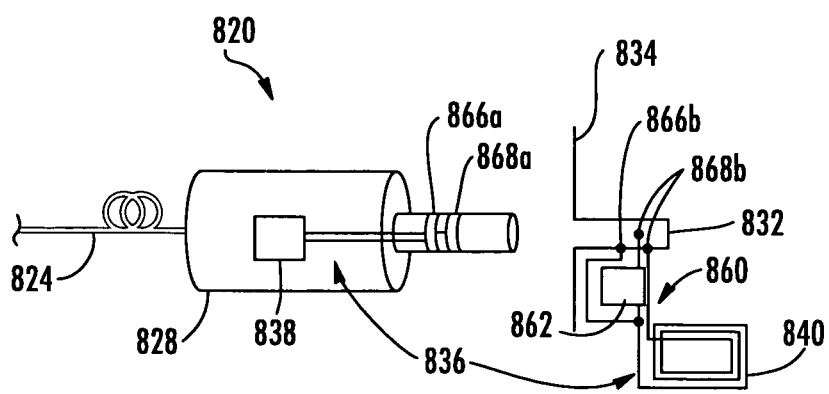
FIG. 11 is a schematic view of yet another embodiment of a plug having an associated plug RFID integrated circuit chip and a socket having an associated socket RFID integrated circuit chip and including one RFID antenna, wherein functionality of the plug RFID transponder and/or the socket RFID transponder is effected by insertion of the plug into the socket.

FIG. 11 shows another modification in which RFID transponders 836 and 860 share a single RFID antenna 840. A connector RFID integrated circuit chip 838 is associated with the connector 820, and an adapter RFID integrated circuit chip 862 is associated with the adapter 832. Connections 866a and 866b, and 868a and 868b, respectively, provide electrical contact to complete the activateable connector RFID transponder 836 and adapter RFID transponder 860.

Figure 12:
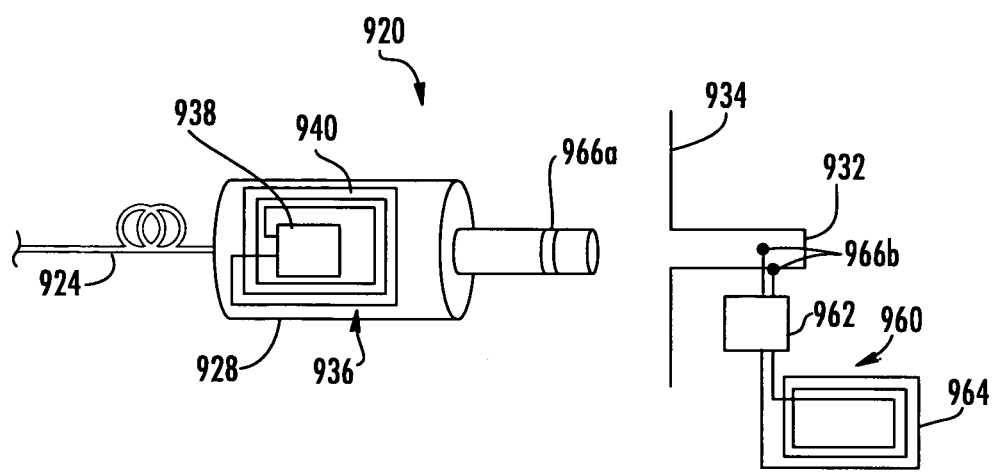
FIG. 12 is a schematic view of another embodiment of a plug having an associated plug RFID transponder and a socket having an associated socket RFID transponder, wherein functionality of the socket RFID transponder is effected by insertion of the plug into the socket, further including a contact closure port function.

FIG. 12 shows yet another embodiment of the present invention in which connector RFID transponder 936 associated with connector 920 and adapter RFID transponder 960 associated with adapter 932 of housing 934 are always complete and active. Therefore, no connections are required to electrically connect RFID integrated circuit chip 938 and RFID antenna 940, or RFID integrated circuit chip 962 and RFID antenna 964. However, the connections 966a and 966b may be used to indicate connection of the plug and the socket, in addition to the functionality described below. It should be kept in mind that any of the condition responsive device embodiments of FIGS. 1-8 could be used with this embodiment, or any other, to detect a condition and/or a change in condition of either of the RFID transponders.

Adapter RFID transponder 960 associated with the adapter 932 of housing 934 includes an electrical contact closure port in communication with RFID integrated circuit chip 962, activated through connections 966a and 966b, which come into contact upon insertion of connector 920 into adapter 932. Therefore, upon insertion of connector 920 into adapter 932, the contact closure condition of RFID transponder 960 will change. Interrogating the RFID transponders and looking for a transponder indicating a change in contact closure condition would identify the RFID transponder associated with the just-connected adapter. If desired, information regarding the adapter and/or connector could then be communicated to the reader regarding one or both of the RFID transponders and the associated component. It should be understood also that the structure and functionality of FIG. 12 could be reversed. Therefore, the RFID transponder in connector 920 could instead include the contact closure port.

Figure 13:
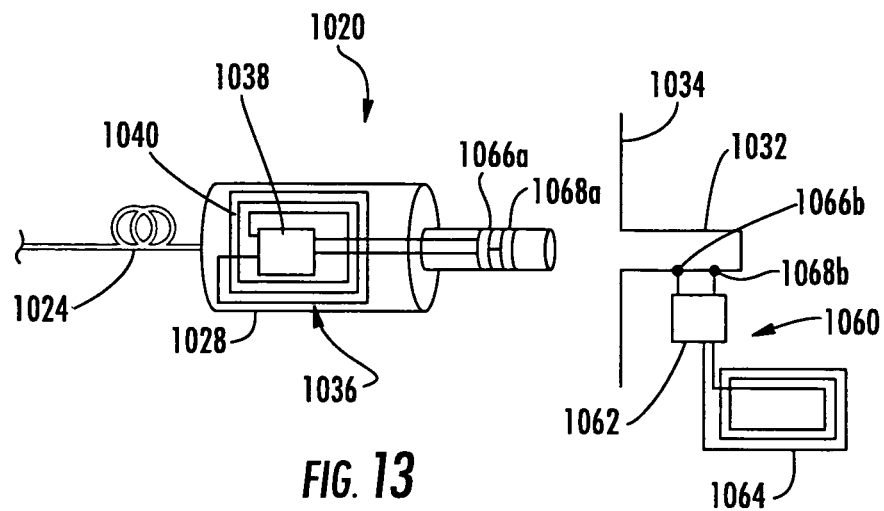
FIG. 13 is a schematic view of still another embodiment of a plug having an associated plug RFID transponder and a socket having an associated socket RFID transponder, wherein functionality of the socket RFID transponder is effected by insertion of the plug into the socket, further including an alternate contact closure port function.

FIG. 13 shows an alternative embodiment of the present invention in which connector RFID transponder 1036 is again entirely located in connector 1020 and adapter RFID transponder 1060 is again entirely located in housing 1034. Both RFID transponders 1036 and 1060 of the embodiment of FIG. 13 are activateable at all times. Electrical connections 1066a and 1066b are provided to allow for a contact closure input adapter for RFID integrated circuit chip 1038. Electrical connections 1068a and 1068b provide a contact closure port output for RFID integrated circuit chip 1062. The contact closure ports created by the contacts can communicate with each other.

This embodiment may or may not rely upon insertion of connector 1020 into adapter 1032. Therefore, this embodiment may operate as above, where insertion of the connector closes both contact closure ports generating a detectable change of condition signal for both the connector and adapter. Alternatively, after insertion of all connectors 1020 into adapters 1032 within housing 1034, the contact closure condition of all housing RFID transponders 1060 could be set to a given value (open or closed). Then, the RFID transponder 1060 for a given adapter could be directed to change its contact closure condition, which would be detected by the associated connector RFID transponder 1036, which would change its condition accordingly. Another polling to determine which connector RFID transponder 1036 had just changed its condition would provide information as to which two RFID transponders 1036 and 1060 in the system were connected. This process could be done the opposite way (starting with the connectors) if desired. Further, this process could be done serially, adapter-by-adapter or connector-by-connector, to map an entire equipment panel in fairly automated fashion. One advantage to the structure of FIG. 13 and the functions made possible thereby are flexibility. Identification can be done by selectively plugging or unplugging, if desired, or by polling without unplugging or any manipulation of buttons by way of directing condition changes via a reader or the like.

Figure 14:
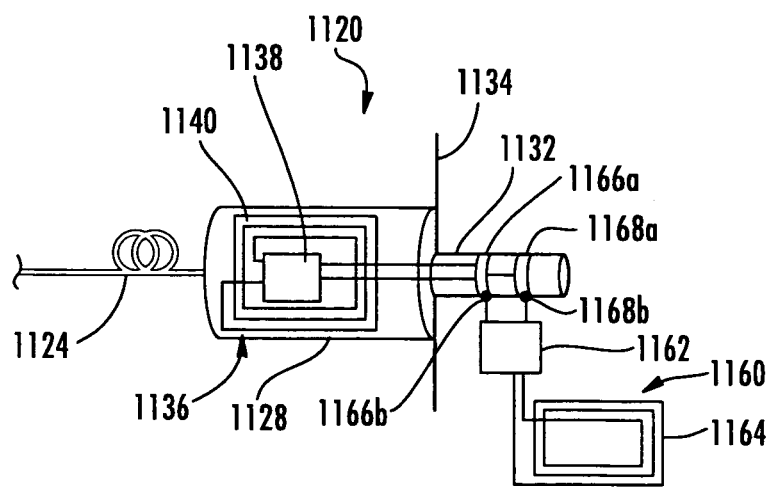
FIG. 14 is a schematic view of another embodiment of a plug having an associated plug RFID transponder and a socket having an associated socket RFID transponder, wherein functionality of the socket RFID transponder is effected by insertion of the plug into the socket, further including an alternate bi-directional contact closure port function.

FIG. 14 shows another connector 1120 and housing 1134 combination of a further embodiment of the present invention, wherein the RFID transponders 1136 and 1160 have bi-directional contact closure ports formed by connections 1166a and 1166b, and 1168a and 1168b. Therefore, the RFID integrated circuit chips 1138 and 1162 could be directed to output their identifications to the other where it would be read and saved, and polling could be conducted to retrieve such information from one or both. In some embodiments of the present invention, an RFID transponder transfers identification information to one or more other RFID transponders using N bit transfer techniques, wherein one integrated circuit forces contact closure (open or closed) N times at a regular interval to provide bits of data (such as identification information) to the other integrated circuit(s) that senses the forced contact closure. Still further embodiments transfer information between or among RFID transponders using other electrical techniques and/or thermal or optical techniques. This approach of RFID transponders identifying one another would allow automatic identification to obtain matching connector and adapter information. RFID integrated circuit chips 1138 and 1162 could require additional power and additional bi-directional communication and sensing functionality. Again, this approach allows cataloging of an entire panel of connections without plugging or unplugging, or the manipulating of buttons or the like.

Figure 15:
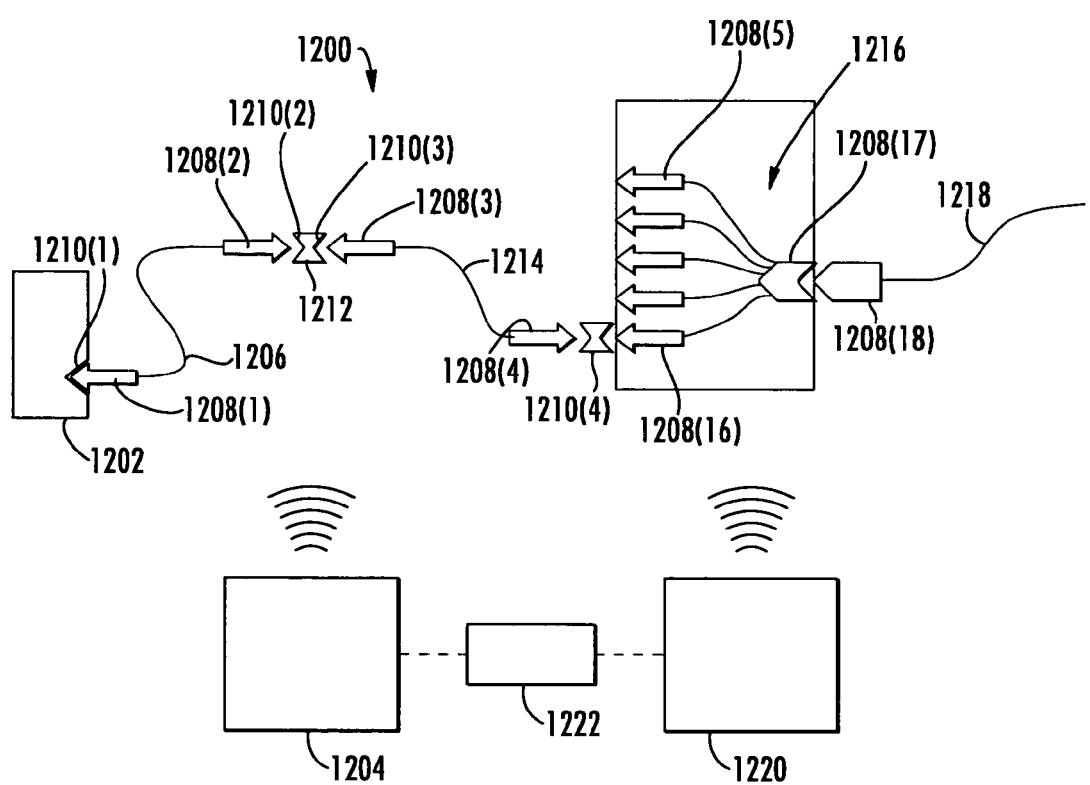
FIG. 15 is a schematic view of one example of a system for mapping fiber optic connections across a network utilizing RFID transponders.

FIG. 15 shows one representative example of a system incorporating certain features of the connectors disclosed above to allow mapping fiber optic cable connections utilizing RFID functions. Various embodiments of the present invention provide for mapping of the physical location of the components associated with the RFID transponders and/or mapping of the connectivity of the components associated with the RFID transponders. Referring again to FIG. 15, as schematically illustrated, system 1200 includes a housing 1202, a reader 1204 and a fiber optic cable 1206. Each end of fiber optic cable 1206 includes a connector 1208(1), 1208(2). Other examples of connectors 1208(3)-1208(18) are further described below. For simplicity of illustration, housing 1202 is shown to include one adapter 1210(1) that receives one connector 1208(1). However, housing 1202 may have a plurality of such adapters for receiving a plurality of connectors. Housing 1202 may comprise any element along a fiber optic cable network, such as a router, server, any connected device, wireless device, patch panel, adapter, or even another connector, etc. Therefore, any device to which a fiber optic cable may be attached could comprise housing 1202.

Each connector 1208 has an associated RFID transponder (not visible in FIG. 15). The RFID transponder may be one of the types discussed above. Thus, the RFID transponders may be entirely or partially located on the connectors. Also, a condition responsive device for detecting a condition and/or change of condition and communicating it to the RFID transponders may also be included. The condition responsive device may include electrical connections, a push button operated device, contact closure structures, or other structures for detecting insertion of a connector plug into an adapter. The adapter may also include an RFID transponder for receiving signals from a condition responsive device and transmitting signals related to the detected condition. Therefore, upon receipt of a connector 1208 into an adapter 1210, a change in condition is registered via one or more of the structures or functions described above. A polling of RFID transponders before and after such insertion, or via sending contact closure instructions and re-polling, will identify which connector and/or adapter have been connected. Information within the inserted connector, in this case 1208(1), will also identify that connector 1208(2) is or should be at the opposite end of fiber optic cable 1206. This information may be made available to the technician, for example for connecting connector 1208(2) to a particular adapter, for connectorizing the cable, etc.

This mapping functionality may be extended. For example, connector 1208(2) may further be received by an adapter 1210(2) in another housing 1212, which may be a patch panel or adapter. Again, a condition responsive device may detect insertion, which can be reported in various ways to reader 1204. Housing 1212 may have another adapter 1210(3) for receiving another connector 1208(3), and the process may continue further, insertion of connector 1208(3) bringing forth identification of connector 1208(4) at the other end of fiber optic cable 1214.

The information can be flexibly managed in various ways, as desired. For example, adapters 1210(2) and 1210(3) may be considered a single adapter connecting two connectors 1208(2) and 1208(3), if desired. Also, internal cabling (not shown) could connect adapters 1210(2) and 1210(3), for example as on the inside of a patch panel housing or the like. The internal cabling could include RFID functionality, for example by connecting to connectors 1208(2) and 1208(3) directly or via adaptors having structure for detecting or communicating change of condition, as described above. Alternatively, a database could hold information regarding which adapters are internally connected within a patch panel by correlating the unique identifications of the respective adapters, and RFID functionality could be employed with the connectors and adapters only.

Cables having different types and numbers of connectors at each end can employ RFID functionality as well. For example, as illustrated, fiber optic cable 1216 comprises a break-out for twelve individual optical fibers. The break-out may also be referred to as a fiber optic fanout assembly. Connectors 1208(5) through 1208(16) (not all shown) each terminate one of the fibers, whereas connector 1208(17) is a multifiber connector. Connector 1208(4) is connected to connector 1208(16), either directly or via an adapter, such as adapter 1210(4). Fiber optic cable 1218 is another twelve-fiber cable having a multifiber connector 1210(18). Each of the connectors and adapters may include RFID transponders, as discussed above, that are associated with condition responsive devices for detecting a condition such as insertion. Also, the RFID transponder on each connector on a cable may be provided at the manufacturing plant and/or in the field with information regarding the other connector or connectors attached to that cable. In addition or alternatively, the RFID transponders may be able to communicate with one another to identify one another and store in memory (preferably in the integrated circuit chip) the identity of the other RFID transponder for subsequent communication with an RFID reader, for example, using the N bit transfer described above with respect to the embodiment of FIG. 14. Therefore, plugging in one end of a cable provides some information via the RFID transponder as to the other end of the cable and/or fiber. It should be understood that any number of fibers could be employed within a cable, and any number of break-outs from the multifiber cable could be employed. Also, a multifiber cable with multifiber connectors at each end could be employed.

It should be kept in mind for purposes of the present disclosure and claims, that a connector connecting directly to other components or another connector (rather than to a patch panel adapter per se, or the like) may be considered an adapter and housing into which the connector is connected. Therefore, the benefits of the present invention, as claimed below, are recognized when two connectors are connected together, with or without an adapter, and one of the connectors or the adapter would therefore be considered the "adapter" for the other connector in that situation. Thus, in some scenarios, the element to which the connector connects would be considered the "adapter" for purposes of this disclosure.

The RFID transponders for multifiber cables may hold additional information, such as fiber order and polarity. If the multifiber connectors include information regarding the ordering of fibers within the multifiber connectors, the functionality can be improved by mapping out with more certainty the communication path throughout the system. Such mapping may include mapping the physical location, the connectivity, and/or other parameters relating to the various components Such a system 1200 can employ a second reader 1220 if desired. Reader 1220 could be a handheld reader used by a technician. In addition or alternatively, reader 1220 could be a second fixed reader (such as reader 1204), so that the range of system 1200 can be extended over a wider area than by using reader 1204 alone. If desired, a database 1222 may be stored in a general or special purpose computer, connected to readers 1204 and 1220 either wirelessly and/or by hard-wiring. Database 1222 can maintain various records as discussed above, including records of connector/adapter connections, RFID interrogations and responses, past and present conditions, and changes of condition, etc.

The use of condition responsive devices to indicate a change of condition such as plug insertion, possibly in combination with cataloged information regarding connector identification by fiber optic cable and/or fiber ordering, can provide various levels of detail and functionality for installing, servicing, or altering a network. It is therefore possible, using the teachings above, to create a network that essentially self-maps itself upon insertion and/or pressing of buttons or other activation of condition responsive devices. Also, such system beneficially does not depend only on proximity of RFID transponders in connectors and adapters, although such functionality could be utilized within a part of such system if desired.

Referring again to the embodiments of the present invention that comprise condition responsive devices, still further embodiments of the present invention comprise condition generating devices that are associated with one or more components (and/or the plug or socket of the respective component) and that are adapted to generate the condition sensed by the condition responsive device. Exemplary embodiments include the systems illustrated in FIGS. 9-14, wherein one of the connector RFID transponder and the adapter RFID transponder includes a condition responsive device and the other RFID transponder comprises a condition generating device. The condition generating device of various embodiments of the present invention generates the condition when a certain event occurs, for example when the plug is inserted into the socket, when the RFID transponder comprising the condition generating device is communicated with by the RFID reader to instruct the generation of the condition, and/or when similar events occur, such that the condition responsive device is able to detect the condition. The condition generated by the condition generating device may be of any form, non-limiting examples include an electric current via an electrical connection, a predetermined RF signal, visual indications, audible indications, or similar conditions. In some embodiments of the present invention the plug must be at least partially received by the socket in order for the condition responsive device to detect the generated condition, whereas in other embodiments the two components with which the condition responsive and condition generating devices are associated need not be in physical contact and/or within a certain distance of one another. The condition generating device of the embodiment of FIG. 14 forces the contact closure that is detected by the condition responsive device (portion of the integrated circuit) of the other RFID transponder to enable the RFID transponder with the condition responsive device to receive information via the N bit transfer from the RFID transponder with the condition generating device. Use of the condition generating device and condition responsive device enable two RFID transponders to communicate with one another in order to correlate the two components, to transfer and/or store identification information about one another, and/or to perform other functions desired by the technician.

As described above with reference to FIG. 15, one component may comprise two or more RFID transponders associated with various portions of the component, such as, for example, a fiber optic drop cable with two or more connectors wherein each connector comprises an associated RFID transponder. In some embodiments of the present invention, each of the RFID transponders associated with the component includes identification information of the other RFID transponders and/or the portions of the component associated with the RFID transponders. In such embodiments, communication with one of the RFID transponders may enable an RFID reader to receive information, such as identification information and the like, about more than one RFID transponder to improve the performance of the RFID system. In additional embodiments of the present invention, the RFID transponders of separate components (or the same component) are adapted to communicate with one another in order to allow information of each of the RFID transponders to be communicated to an RFID reader via communication with only one RFID transponder. In certain of these additional embodiments, the integrated circuit chip of the RFID transponder comprises a memory into which may be stored identification information of other RFID transponders and from which such additional identification information may be retrieved to provide to an RFID reader and/or other RFID transponders. The memory of certain embodiments of the present invention may permanently retain information, may delete information at predetermined intervals, may delete information when commanded, and/or may delete information upon occurrence of a particular event, such as disconnecting the plug from the socket, to list one non-limiting example.

In view of the above, it is apparent that many modifications and re-combinations of the above embodiments or their components may be done within the scope of the invention. Connectors, adapters, cables including connectors, connections comprising a connector and adapter, and mapping systems may include some or multiple of the above features and functionality. One or more condition responsive devices can detect differences in condition. Communication of the detected conditions, either by or between RFID transponders, can provide useful information for identifying or mapping one or more connectors, cables or connections, including mapping all connections on a single panel or across a network. Reliance on alternative systems requiring relative proximity RFID function is not necessary, as detected conditions of one sort or another provide information. Changes in condition brought about by insertion of a connector into an adapter can be designed with connector tolerances that make the resulting information more accurate than proximity-based systems as well, thereby reducing or eliminating false positives. Further, such change-of-condition based systems allow for panels to efficiently include more connections, more tightly spaced. Also, past and present condition information can be stored for later RFID communication for various functions and purposes. If desired some, most or substantially all of the RFID transponder hardware may be located on the connector or housing, depending on the desired application, the need for additional connections, power, etc.

Thus, it will be apparent to those skilled in the art that various modifications and variations can be made to the present invention without departing from the spirit and scope of the invention. Thus it is intended that the present invention cover the modifications and variations of this invention provided they come within the scope of the appended claims and their equivalents.

That which is claimed:

1. A passive RFID transponder assembly associated with at least one communications component, the RFID transponder assembly comprising:
    an integrated circuit chip;
    an antenna adapted for electrical connection with the integrated circuit chip; and
    at least one selective physical contact condition responsive device electrically connected to the integrated circuit chip, wherein the integrated circuit chip is adapted to read a selective physical contact condition relating to the at least one communications component detected by the at least one selective physical contact condition responsive device;
    wherein the passive RFID transponder assembly is configured to communicate a radio-frequency (RF) signal including the selective physical contact condition relating to the at least one communications component to an RFID reader whenever the selective physical contact condition is requested by the RFID reader and regardless of the selective physical contact condition detected by the at least one condition responsive device.

2. A transponder assembly according to claim 1, wherein the selective physical contact condition detected by the at least one selective physical contact condition responsive device comprises selective physical contact of the at least one communications component.

3. A transponder assembly according to claim 1, wherein the selective physical contact condition detected by the at least one selective physical contact condition responsive device comprises selective physical contact of the at least one communications component with a mating component.

4. A transponder assembly according to claim 1, further comprising at least one environmental condition responsive device electrically connected to the integrated circuit chip, wherein the integrated circuit chip is further adapted to read an environmental condition relating to the at least one communications component detected by the at least one environmental condition responsive device;
    wherein the passive RFID transponder assembly is further configured to communicate a radio-frequency (RF) signal including the environmental condition relating to the at least one communications component to the RFID reader whenever the environmental condition is requested by the RFID reader and regardless of the environmental condition detected by the at least one environmental condition responsive device.

5. The transponder assembly according to claim 4, wherein the environmental condition detected by the at least one environmental condition responsive device relates to a sensed attribute relating to the at least one communications component.

6. A transponder assembly according to claim 4, wherein the environmental condition comprises at least one of the group of temperature, pressure, humidity, and light exposure.

7. A transponder assembly according to claim 1, wherein the at least one selective physical contact condition responsive device is physically included within the integrated circuit chip.

8. A transponder assembly according to claim 1, wherein the antenna of the RFID transponder assembly is associated within a mating component of communications equipment, such that an electrical contact between the integrated circuit chip and the antenna defines the selective physical contact condition detected by the at least one selective physical contact condition responsive device.

9. A transponder assembly according to claim 1, wherein at least one of the integrated circuit chip and the antenna is associated with the at least one communications component comprised from the group consisting of: a fiber optic connector, a fiber optic adapter, a fiber optic patch panel, and a fiber optic equipment rack.

10. A transponder assembly according to claim 1, wherein at least one of the integrated circuit chip and the antenna is associated with the at least one communications component comprised from the group consisting of: a copper connector, a copper adapter, and a copper cable.

11. A transponder assembly according to claim 1, wherein the integrated circuit chip is powered by an external power source.

12. A transponder assembly according to claim 1, wherein the transponder assembly is further configured to selectively communicate identification information along with the selective physical contact condition relating to the at least one communications component.

13. A transponder assembly according to claim 1, wherein the selective physical contact condition detected by the at least one selective physical contact condition responsive device further comprises selective physical contact of the at least one communications component by a technician.

14. The transponder assembly according to claim 1, wherein the integrated circuit chip is associated with the at least one communications component comprised from the group consisting of a fiber optic connector, a fiber optic adapter, a fiber optic patch panel, and a fiber optic equipment rack.

15. The transponder assembly according to claim 1, wherein the transponder assembly is associated with the at least one communications component comprised from the group consisting of: a fiber optic connector, a fiber optic adapter, a fiber optic patch panel, and a fiber optic equipment rack.

16. The transponder assembly according to claim 1, further comprising at least one operational condition responsive device electrically connected to the integrated circuit chip, wherein the integrated circuit chip is further adapted to read an operational condition relating to the at least one communications component detected by the at least one operational condition responsive device;
wherein the passive RFID transponder assembly is further configured to communicate a radio-frequency (RF) signal including the operational condition relating to the at least one communications component to the RFID reader whenever the operational condition is requested by the RFID reader and regardless of the operational condition detected by the at least one operational condition responsive device.

17. The transponder assembly according to claim 16, wherein the operational condition is comprised from the group consisting of a connection status of the at least one communications component, a performance of the at least one communications component, an impedance of the at least one communications component, a contact closure of the at least one communications component, and a touching of the at least one communications component by a technician.

18. A passive RFID transponder assembly associated with a component of communications equipment, the RFID transponder assembly comprising:
an integrated circuit chip;
an antenna adapted for electrical connection with the integrated circuit chip; and
at least one selective physical contact condition responsive device in selective electrical connection with the integrated circuit chip, wherein the integrated circuit chip is adapted to read a selective physical contact condition relating to the component of communications equipment detected by the at least one selective physical contact condition responsive device;
wherein the passive RFID transponder assembly is configured to communicate a radio-frequency (RF) signal including the selective physical contact condition relating to the component of communications equipment to an RFID reader whenever the selective physical contact condition is requested by the RFID reader and when the at least one selective physical contact condition responsive device is in electrical contact with the integrated circuit chip, regardless of the selective physical contact condition detected by the at least one selective physical contact condition responsive device.

19. A transponder assembly according to claim 18, wherein the at least one selective physical contact condition responsive device comprises a switch adapted for selective physical contact to selectively electrically connect the at least one selective physical contact condition responsive device to or disconnect the at least one selective physical contact condition responsive device from the integrated circuit chip.

20. A transponder assembly according to claim 19, wherein the switch is comprised of a push button switch adapted for selective physical contact by a technician.

21. A transponder assembly according to claim 18, wherein the at least one selective physical contact condition responsive device comprises a switch adapted for selective physical contact to selectively adjust a capacitance of the at least one selective physical contact condition responsive device.

22. A transponder assembly according to claim 18, wherein the at least one selective physical contact condition responsive device comprises a switch adapted for selective physical contact by at least one of a technician and a mating component.

23. A transponder assembly according to claim 18, wherein the selective physical contact condition detected by the at least one selective physical contact condition responsive device comprises selective physical contact of the component of communications equipment with a mating component of communications equipment.

24. A transponder assembly according to claim 23, wherein the component of communications equipment comprises a plug and the mating component of telecommunications equipment comprises a socket, and wherein the selective physical contact condition detected by the at least one selective physical contact condition responsive device comprises the selective insertion of the plug into the socket.

25. A transponder assembly according to claim 18, wherein the integrated circuit chip defines an identity and wherein the RFID transponder assembly is configured to selectively communicate the identity of the integrated circuit chip.

26. A passive RFID transponder assembly associated with at least one communications component comprising:
an integrated circuit chip;
an antenna adapted for electrical connection with the integrated circuit chip; and
at least one selective physical contact condition responsive device in selective electrical connection with the integrated circuit chip, wherein the integrated circuit chip is adapted to read a selective physical contact condition relating to the at least one communications component detected by the at least one selective physical contact condition responsive device;
wherein the selective physical contact condition detected by the at least one selective physical contact condition responsive device comprises actuation of the at least one selective physical contact condition responsive device by a fitted component.

27. A transponder assembly according to claim 26, wherein the at least one selective physical contact condition responsive device comprises a push button switch adapted for selective physical contact to selectively electrically connect the antenna to or disconnect the antenna from the integrated circuit chip.

28. A transponder assembly according to claim 26, wherein the at least one selective physical contact condition responsive device comprises a switch adapted for selective physical contact by the fitted component.

29. A transponder assembly according to claim 26, further comprising at least one environmental condition responsive device electrically connected to the integrated circuit chip, wherein the integrated circuit chip is further adapted to read an environmental condition relating to the at least one communications component detected by the at least one environmental condition responsive device;

wherein the passive RFID transponder assembly is further configured to communicate a radio-frequency (RF) signal including the environmental condition relating to the at least one communications component to the RFID reader whenever the environmental condition is requested by the RFID reader and regardless of the environmental condition detected by the at least one environmental condition responsive device.

30. A transponder assembly according to claim 29, wherein the at least one environmental condition responsive device comprises a variable impedance element either in series or parallel with the antenna.

31. A transponder assembly according to claim 29, wherein the at least one environmental condition responsive device further comprises a variable impedance element, wherein the environmental condition responsive device varies the impedance by changing at least one of the group of resistance, inductance, and capacitance of the environmental condition responsive device.

32. A transponder assembly according to claim 26, wherein at least one of the integrated circuit chip and the antenna is associated with the at least one communications component comprised from the group consisting of: a fiber optic connector, a fiber optic adapter, a fiber optic patch panel, and a fiber optic equipment rack.

33. A transponder assembly according to claim 26, wherein at least one of the integrated circuit chip and the antenna is associated with the at least one communications component comprised from the group consisting of: a copper connector, a copper adapter, and a copper adapter, and a copper cable.

34. The transponder assembly of claim 26, configured to communicate a radio-frequency (RF) signal including the selective physical contact condition relating to the fitted component to an RFID reader whenever the selective physical contact condition is requested by the RFID reader.

* * * * *